United States Patent
Liu et al.

(10) Patent No.: US 11,561,872 B2
(45) Date of Patent: Jan. 24, 2023

(54) HIGH AVAILABILITY DATABASE SYSTEM

(71) Applicants: Chao-Jen Liu, New Taipei (TW); Yen-Chen Chen, New Taipei (TW)

(72) Inventors: Chao-Jen Liu, New Taipei (TW); Yen-Chen Chen, New Taipei (TW)

(73) Assignee: ITEX INTERNATIONAL INC., New Taipei (TW)

( * ) Notice: Subject to any disclaimer, the term of this patent is extended or adjusted under 35 U.S.C. 154(b) by 0 days.

(21) Appl. No.: 17/330,488

(22) Filed: May 26, 2021

(65) Prior Publication Data

US 2022/0382657 A1 Dec. 1, 2022

(51) Int. Cl.
*G06F 11/20* (2006.01)
*G06F 16/23* (2019.01)
*G06F 16/27* (2019.01)
*G06F 11/14* (2006.01)

(52) U.S. Cl.
CPC ...... *G06F 11/2094* (2013.01); *G06F 11/1464* (2013.01); *G06F 16/2365* (2019.01); *G06F 16/27* (2019.01); *G06F 2201/80* (2013.01)

(58) Field of Classification Search
None
See application file for complete search history.

(56) References Cited

U.S. PATENT DOCUMENTS

| | | | | |
|---|---|---|---|---|
| 8,489,742 B2* | 7/2013 | Clubb | ............. | G06F 9/505 |
| | | | | 709/224 |
| 8,577,795 B2* | 11/2013 | Clubb | ............. | G06Q 20/105 |
| | | | | 705/39 |
| 8,918,506 B1* | 12/2014 | Clubb | ............. | G06Q 20/405 |
| | | | | 709/224 |
| 10,360,563 B1* | 7/2019 | Clubb | ............. | G06Q 20/405 |
| 10,387,369 B1* | 8/2019 | Davenport | ............. | G06F 3/0689 |
| 10,404,799 B2* | 9/2019 | Mitkar | ............. | G06F 11/1464 |
| 10,482,065 B1* | 11/2019 | Armangau | ............. | G06F 16/1748 |
| 11,368,399 B2* | 6/2022 | Nagaraj | ............. | H04L 47/122 |
| 2014/0078957 A1* | 3/2014 | Shin | ............. | H04L 41/0893 |
| | | | | 370/326 |
| 2020/0267015 A1* | 8/2020 | Peterson | ............. | H04L 12/2816 |
| 2021/0342771 A1* | 11/2021 | Su | ............. | G16H 40/20 |
| 2022/0109502 A1* | 4/2022 | Bisht | ............. | H04L 49/1515 |
| 2022/0129176 A1* | 4/2022 | Kabishcer | ............. | G06F 3/0671 |
| 2022/0129561 A1* | 4/2022 | Shivanna | ............. | G06F 21/57 |
| 2022/0138223 A1* | 5/2022 | Sonner | ............. | G06F 16/27 |
| | | | | 707/620 |
| 2022/0174114 A1* | 6/2022 | Peake | ............. | H03M 13/3761 |

\* cited by examiner

*Primary Examiner* — Kim T Nguyen

(57) ABSTRACT

A database system includes a master server, a pair of slave servers and a main storage carrier. Each slave server is provided with a database management system (DBMS). The main storage carrier and the pair of slave servers uses the ISCSI protocol to make the pair of slave servers serving as the DBMS and the main storage carrier serving as a database (DB) connect and communicate to further make the DBMS and the DB independent and separate. The master server performs service assignment to the pair of slave servers according to a predetermined weight value. All connections of the database are directed to the slave server with a high weight value, and the other slave server with a low weight value serves as a standby.

4 Claims, 1 Drawing Sheet

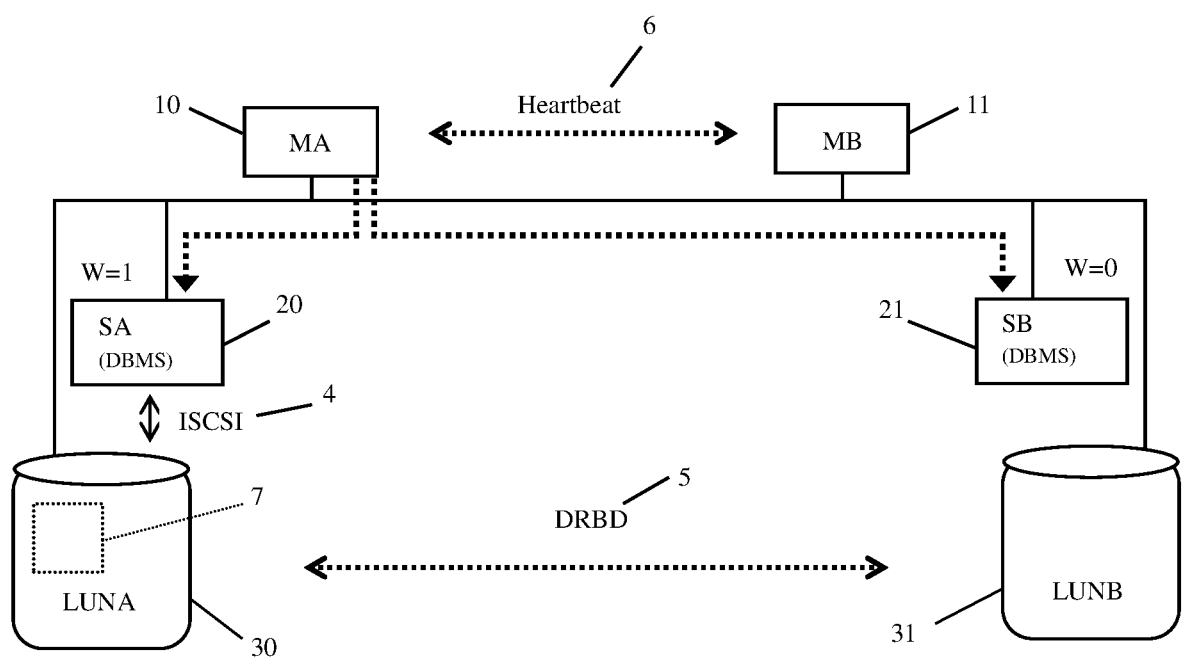

HIGH AVAILABILITY DATABASE SYSTEM

BACKGROUND

Technical Field

The invention relates to database systems, particularly to a database system framework for operating with a high availability mechanism to provide an uninterrupted service of database and keep the data stored possess consistency and integrality.

Related Art

A high availability system is a mechanism that immediately switches to a backup device to provide an uninterrupted service when a disaster or malfunction happens. This can reduce occurrence frequency of service interruption due to malfunction or power outage of a single device in a system. To keep high availability (HA) of equipment, a system includes at least two devices which are swappable. The currently used device is called "operating device", which has a destination IP address, and the other one is called "standby device", which has no destination IP address. When the operating device fails or malfunctions, the standby device will be automatically switched to be an operating device and take over the destination IP address to provide the service.

The invention deals with database systems for storing corporate operation data. They relate to the core of corporate survival, so how to keep high availability of such a system to uninterruptedly provide service is an important issue. Roughly speaking, the most frequent cause of damage and failure of a database system is sudden crash or power outage during data access. Particularly, a general database management system has a mechanism that stores data to a scratch pad memory first and then write in a hard-disk drive to improve systematic operation performance, so when the database system crashes or loses power, data loss is hard to be avoided because the data cannot be written in the hard-disk drive timely even if a high availability backup mechanism has been established in the system to implement failover. The original backup device takes over the operation without complete and correct data. Finally, this will cause chaos of the database in the hard-disk drive to be irremediable.

SUMMARY

An object of the invention is to provide a high availability database system, which can avoid data loss and keep consistency and integrality of data. The invention makes the database management system (DBMS) and the database (DB) independent and separate, and uses the ISCSI protocol to create mutual communication and connection for flexibly planning file capacity to store data. When data is being written in the storage carrier, data loss due to the data is not timely written in the hard-disk drive can be avoided even if one of the DBMSs crashes or fails to implement failover.

To accomplish the above object, the database system of the invention includes a first master server, a pair of slave servers and two storage carriers. Each of the pair of slave servers is provided with a database management system (DBMS). The two storage carriers include a main storage carrier and a second storage carrier. The main storage carrier and the pair of slave servers uses an internet small computer system interface (ISCSI) protocol to make the pair of slave servers serving as the DBMS and the main storage carrier serving as a database (DB) connect and communicate to further make the DBMS and the DB independent and separate. The first master server performs service assignment to the pair of slave servers according to a predetermined weight value instead of load balance. All connections of the database are directed to the slave server with a high weight value by the first master server, and the other slave server with a low weight value serves as a standby to constitute a backup mechanism of the database service management. When the DBMS of one of the pair of slave servers is writing data to the DB, the data will be recorded in a log document file of the main storage carrier with being prior to being written to the DB, so that no matter which one of the slave servers fails, another slave server which takes over is capable of obtaining the data to be written to the database from the log document file to keep data consistency. On the other hand, the main storage carrier and the second storage carrier are established with a DRBD mirroring mechanism through internet. When the main storage carrier fails, a timely backup data can be obtained for restoration. Not only is a high availability environment established for the database system, but also future expandability and efficiency of data backup can be obtained.

BRIEF DESCRIPTION OF THE DRAWING

FIG. 1 is a framework diagram of the database system of the invention.

DETAILED DESCRIPTION

As shown in FIG. 1, the database system of the invention includes a first master server MA 10, at least one pair of slave servers SA 20, SB 21 and at least two independent storage carriers LUNA 30, LUNB 31. Both the pair of slave servers 20, 21 and the two storage carriers are connected to and controlled by the first master server 10 through internet.

In detail, the pair of slave servers includes a first slave server SA 20 and a second slave server SB 21. Each of the first slave server 20 and the second slave server 21 is provided with a database management system (DBMS). The DBMS is a set of computer program which can control the classification, operation and data access of database (DB).

The two storage carriers includes a main storage carrier LUNA 30 and a second storage carrier LUNB 31. The main storage carrier LUNA 30, the first slave server SA 20 and the second slave server SB 21 utilize the Internet Small Computer System Interface (ISCSI) and the storage technology based on both internet and the ISCSI protocol to set the main storage carrier LUNA 30 as a target of the ISCSI 4 and to set both the first slave server SA 20 and the second slave server SB 21 as an initiator so as to make the first and second slave servers SA 20, SB 21 serving as the DBMS and the main storage carrier LUNA 30 serving as the database (DB) connect and communicate to further make the DBMS and the DB independent and separate.

The bases of the main storage carrier LUNA 30 and the second storage carrier LUNB 31 are established with a Distributed Replicated Block Device (DRBD) mechanism. The DRBD 5 is a distributed storage system on Linux platform, which is similar to RAID 1 mirroring technology of disk array to synchronize data of the both. In the invention, the DRBD 5 of the storage carrier adopts the single master mode, which means any resource at any specific time, only one master node exists in the two-node cluster. That is, the first slave server SA 20 or the second slave server SB 21, which serves as the DBMS must write data into the main storage carrier LUNA 30, and the second storage carrier LUNB 31 is on standby to instantly back up the main storage carrier LUNA 30 to avoid data loss. In other words, when the main storage carrier LUNA 30 fails, an instant backup data will be generated for restoration of the DB.

The first master server MA 10 controls the operation of the first slave server SA 20 and the second slave server SB 21. In particular, in the database system of the invention, the first master server MA 10 performs service assignment to the first slave server SA 20 and the second slave server SB 21 according to a predetermined weight value instead of load balance. In detail, an automatic control program is used to direct all connections of the database to the first slave server SA 20 with a high weight value (w=1), and the second slave server SB 21 with a low weight value (w=0) serves as a standby. If the first slave server SA 20 cannot normally provide service, then the first master server MA 10 changes the weight value of the second slave server SB 21 from 0 to 1 and directs all connections of the database to the second slave server SB 21 as a standby of the database service. For example, the system generates a virtual IP address (VIP) as a representative position of the slave server cluster SA and SB in intranet first, then the VIP is set to the first master server MA 10. The first master server MA 10 utilizes two kits of Linux, namely, "ipvsadm" and "keepalived", to implement the function of HA of the both. The two kits are also utilized to execute the control of weight value to accomplish the function of user online of assigning the slave server clusters SA and SB. The configuration of the backup mechanism is in the profile "keepalived.conf" of the kit "keepalived". By detecting the tcp or udp port of the database by "keepalived", when the first slave server SA cannot provide service, MA 10 controls the weight value through "notify down" trigger to change the weight value of the second slave server SB from 0 to 1 and directs all connections to SB to continuously provide service of the DBMS to users. Once the DBMS of SA is back to normal, MA 10 will change the weight value of SB through "notify up" trigger from 1 to 0 and direct all connections back to SA.

In addition, to avoid data loss due to performing the failover by the first slave server SA 20 and the second slave server SB 21, while the first slave server SA 20 and the second slave server SB 21 is writing data to the database, the data will be recorded in a log document file 7 of the main storage carrier LUNA 30 with being prior to being written to the database DB through the WAL (Write-Ahead-Logging) technology, and both the database DB and the log document file 7 are asynchronously mirrored to the second storage carrier LUNB 31 through the DRBD 5, so that no matter which one of the slave servers SA 20, SB 21 fails, another DBMS which takes over is capable of obtaining the data to be written to the database from the log document file 7 to keep data consistency.

Furthermore, to improve the degree of high availability "HA" of the database system, the invention is disposed with a second master server MB 11, at least one pair of slave servers SA 20, SB 21 and at least two storage carriers LUNA 30, LUNB 31. Both the pair of slave servers SA 20, SA 21 and the storage carriers LUNA 30, LUNB 31 are connected to and controlled by the second master server MB 11 through internet. When the first master server MA 10 is preset as an operating device, the second master server MB 11 serves as a standby. A heartbeat detection mechanism 6 is disposed between the first master server MA 10 and the second master server MB 11, so that the two master servers MA 10, MB 11 can mutually send heartbeat packets. At the predetermined period, if the second master server MB 11 fails to receive a heartbeat packet from the first master server MA 10, the second master server 11 is automatically switched to be an operating device and takes over resources to keep the database service normal. This creates an operating environment with high availability.

Accordingly, the database system of the invention completes separation of the DBMS and the DB for flexibly planning file capacity to store data. When storing data, the data is directly written in the main When data is being written in the storage carrier. When the failover is being performing by adjustment of weight value by MA 10, data loss due to the data is not timely written in the hard-disk drive LUNA can be avoided even if one of the DBMSs SA, SB crashes or fails. Meanwhile, by the DRBD mirroring mechanism between the main storage carrier LUNA 30 and the second storage carrier LUNB 31, an instant backup data can still be obtained for restoration when the main storage carrier LUNA 30 malfunctions. Not only is a high availability environment established for the database system, but also future expandability and efficiency of data backup can be obtained.

Those skilled in the art will appreciate that numerous changes and modifications can be made to the preferred embodiment of the invention, and that such changes and modifications can be made without departing from the spirit of the invention.

What is claimed is:

1. A high availability database system comprising a first master server, a pair of slave servers and a main storage carrier with a built-in database (DB), wherein both the pair of slave servers and the main storage carrier are connected to and controlled by the first master server through internet;
   wherein the pair of slave servers comprises a first slave server and a second slave server, each of the first slave server and the second slave server is provided with a database management system (DBMS) to access a data in the database, the main storage carrier, the first slave server and the second slave server connect and communicate through an internet small computer system interface (ISCSI) protocol, the main storage carrier is preset as a target of the ISCSI and both the first slave server and the second slave server are preset as an initiator of the ISCSI to make the DBMS and the DB independent and separate;
   wherein the first master server assigns a priority to the first slave server and the second slave server according to a weight value (w), all the connections to the database are directed to the first slave server which defaults to a high weight value (w=1), the second slave server with to a low weight value (w=0) is on standby, the said first master server will boost the weight value of the second slave server and directs all connections to the database to the second slave server to take over when the first slave server is failed to provide service;
   wherein the data of first DBMS is recorded a log file in the main storage carrier with a Write-Ahead-Logging (WAL) before the first DBMS stores the data to the database, so that the second DBMS is capable of obtaining the data to be stored to the database from the log file which has not been stored to the database when the first slave server is failed to provide service.

2. The high availability database system of claim 1, further comprising a second storage carrier, wherein the main storage carrier and the second storage carrier are established with a Distributed Replicated Block Device (DRBD) mechanism, the DRBD mechanism adopts a single master mode, which means any resource at any specific time, only one master node exists in the two-node cluster, the first slave server or the second slave server, which serves as the DBMS write data into the main storage carrier, and the second storage carrier is on standby to instantly back up the main storage carrier.

3. The high availability database system of claim 2, further comprising a second master server and a second storage carrier, wherein both the pair of slave servers and the storage carriers are connected to and controlled by the second master server through internet, and the second master server serves as a standby when the first master server is preset as an operating device.

4. The high availability database system of claim 3, wherein a heartbeat detection mechanism is disposed between the first master server and the second master server, the two master servers mutually send heartbeat packets, and the second master server is automatically switched to be the operating device and takes over resources to keep the database service normal if the second master server fails to receive a heartbeat packet from the first master server.

\* \* \* \* \*